United States Patent
Tonar et al.

(10) Patent No.: US 10,434,948 B2
(45) Date of Patent: Oct. 8, 2019

(54) DISPLAY SYSTEM WITH PHASE ORIENTED REFLECTIVE CONTROL

(71) Applicant: Gentex Corporation, Zeeland, MI (US)

(72) Inventors: William L. Tonar, Holand, MI (US); David J. Cammenga, Zeeland, MI (US); Gary J. Dozeman, Zeeland, MI (US); Danny L. Minikey, Jr., Fenwick, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/612,135

(22) Filed: Jun. 2, 2017

(65) Prior Publication Data

US 2017/0349103 A1  Dec. 7, 2017

Related U.S. Application Data

(60) Provisional application No. 62/345,234, filed on Jun. 3, 2016, provisional application No. 62/345,240, filed on Jun. 3, 2016.

(51) Int. Cl.
*B60R 1/08* (2006.01)
*B60Q 1/26* (2006.01)
(Continued)

(52) U.S. Cl.
CPC ............ *B60R 1/088* (2013.01); *B60Q 1/2665* (2013.01); *G02B 5/3041* (2013.01); *G06F 13/122* (2013.01)

(58) Field of Classification Search
CPC ..... B60R 1/088; G06F 13/122; B60Q 1/2665; G02B 5/3041; G02B 27/0172; G02B 5/30;
(Continued)

(56) References Cited

U.S. PATENT DOCUMENTS 5,200,843 A * 4/1993 Karasawa ................ G09F 19/18
                                                  348/E5.141
5,422,756 A * 6/1995 Weber ..................... G02B 5/124
                                                  359/485.03
(Continued)

FOREIGN PATENT DOCUMENTS

JP   58188602 U   12/1983
WO   9517303 A1   6/1995
(Continued)

OTHER PUBLICATIONS

International Search Report and Written Opinion of the International Searching Authority, dated Oct. 12, 2017, for International Application No. PCT/US2017/035599 filed Jun. 2, 2017, 9 pages.

*Primary Examiner* — Jose R Soto Lopez
(74) *Attorney, Agent, or Firm* — Price Heneveld LLP; Bradley D. Johnson

(57) ABSTRACT

A vehicle display mirror system is disclosed. The system comprises a display device and a reflecting polarizer. The display device is operable to display image data on a display surface as display light. The reflecting polarizer comprises a light receiving surface proximate the display surface and configured to output the display light in a first polarization from an emitting surface. The system further comprises a liquid crystal element, a polarizing element, and a controller. The controller is in communication with the liquid crystal element and configured to selectively align a liquid crystal material to pass the display light through the liquid crystal element and deactivate the liquid crystal element to adjust a received light from the first polarization to a second polarization and reflect the second polarization from the emitting surface.

19 Claims, 5 Drawing Sheets

(51) Int. Cl.
*G02B 5/30* (2006.01)
*G06F 13/12* (2006.01)

(58) Field of Classification Search
CPC .......... G02F 1/133536; G02F 1/13338; G02F 1/13362; G09G 3/3406; G09G 2300/0426; G09G 2310/0235
See application file for complete search history.

(56) References Cited

U.S. PATENT DOCUMENTS

| | | | |
|---|---|---|---|
| 5,434,407 | A | 7/1995 | Bauer et al. |
| 5,448,397 | A | 9/1995 | Tonar |
| 5,451,822 | A | 9/1995 | Bechtel et al. |
| 5,686,979 | A * | 11/1997 | Weber ................. E06B 9/24 349/96 |
| 5,818,625 | A | 10/1998 | Forgette et al. |
| 6,020,987 | A | 2/2000 | Baumann et al. |
| 6,157,480 | A | 12/2000 | Anderson et al. |
| 6,166,848 | A | 12/2000 | Cammenga et al. |
| 6,356,376 | B1 | 3/2002 | Tonar et al. |
| 6,700,692 | B2 | 3/2004 | Tonar et al. |
| 7,009,751 | B2 | 3/2006 | Tonar et al. |
| 7,042,616 | B2 | 5/2006 | Tonar et al. |
| 7,221,363 | B2 | 5/2007 | Roberts et al. |
| 7,502,156 | B2 | 3/2009 | Tonar et al. |
| 7,688,495 | B2 | 3/2010 | Tonar et al. |
| 8,237,909 | B2 | 8/2012 | Ostreko et al. |
| 8,339,526 | B2 | 12/2012 | Minikey, Jr. et al. |
| 8,411,245 | B2 | 4/2013 | Lee et al. |
| 2002/0015130 | A1* | 2/2002 | Munakata ............. G02F 1/141 349/172 |
| 2003/0016327 | A1* | 1/2003 | Kotchick ............ G06F 1/1609 349/149 |
| 2003/0090448 | A1* | 5/2003 | Tsumura ........... G02F 1/134363 345/87 |
| 2004/0201545 | A1* | 10/2004 | Yamazaki ............... G09G 3/30 345/1.1 |
| 2007/0146261 | A1* | 6/2007 | Matsushima ........ G09G 3/3688 345/87 |
| 2008/0137008 | A1* | 6/2008 | Rogojevic ......... G02F 1/133603 349/69 |
| 2008/0302657 | A1 | 12/2008 | Luten et al. |
| 2009/0096937 | A1 | 4/2009 | Bauer et al. |
| 2009/0179882 | A1* | 7/2009 | Uchiyama ........... G09G 3/3655 345/207 |
| 2009/0201137 | A1 | 8/2009 | Weller et al. |
| 2011/0096100 | A1* | 4/2011 | Sprague ............ G02B 27/286 345/690 |
| 2011/0316828 | A1* | 12/2011 | Shirbabadi ............ G06F 1/1603 345/207 |
| 2012/0008054 | A1* | 1/2012 | Kwon .................... G09G 3/003 349/13 |
| 2013/0027366 | A1* | 1/2013 | Oki ..................... H04N 13/337 345/204 |
| 2013/0194169 | A1* | 8/2013 | Nishida ................ G02F 1/1336 345/102 |
| 2013/0222522 | A1* | 8/2013 | Fussy ..................... H04N 7/144 348/14.08 |
| 2014/0009914 | A1* | 1/2014 | Cho ......................... G09F 9/35 362/97.3 |
| 2014/0268351 | A1 | 9/2014 | VanderPloeg et al. |
| 2015/0285956 | A1* | 10/2015 | Schmidt ................ G02B 1/005 359/352 |
| 2016/0026039 | A1* | 1/2016 | Sakai ................ G02F 1/133555 345/1.3 |
| 2016/0034084 | A1* | 2/2016 | Tseng .................... G06F 3/0412 345/173 |
| 2016/0062121 | A1* | 3/2016 | Border ............... G02B 27/0172 359/630 |
| 2016/0070113 | A1* | 3/2016 | Travis ................... G02F 1/1323 349/18 |
| 2016/0116979 | A1* | 4/2016 | Border .................... G06F 3/013 345/156 |
| 2016/0131912 | A1* | 5/2016 | Border ............... G02B 27/0176 345/8 |
| 2016/0140919 | A1* | 5/2016 | Yim ..................... G09G 3/3648 345/89 |
| 2016/0154269 | A1* | 6/2016 | Fukuoka ........... G02F 1/133536 345/690 |
| 2016/0252773 | A1* | 9/2016 | Kim ................... G02F 1/133308 345/206 |
| 2016/0334617 | A1* | 11/2016 | Cers ......................... B60R 1/12 |
| 2017/0059935 | A1* | 3/2017 | Hakoi ................ G02F 1/133555 |
| 2017/0116936 | A1* | 4/2017 | Nishida ............. G02F 1/133345 |
| 2017/0192158 | A1* | 7/2017 | Lee ....................... G02B 6/0036 |
| 2017/0193968 | A1* | 7/2017 | Wei ..................... G02F 1/13336 |
| 2017/0312614 | A1* | 11/2017 | Tran ....................... H04W 4/027 |
| 2017/0344166 | A1* | 11/2017 | Nam ....................... G06F 3/0416 |
| 2018/0017729 | A1* | 1/2018 | Fukuoka ................. G02B 6/00 |
| 2018/0105110 | A1* | 4/2018 | Anzai ....................... B60R 1/04 |
| 2018/0164882 | A1* | 6/2018 | Johnson ................. G06F 3/013 |

FOREIGN PATENT DOCUMENTS

| | | |
|---|---|---|
| WO | 2011068852 A1 | 6/2011 |
| WO | 2013116460 A1 | 8/2013 |

* cited by examiner

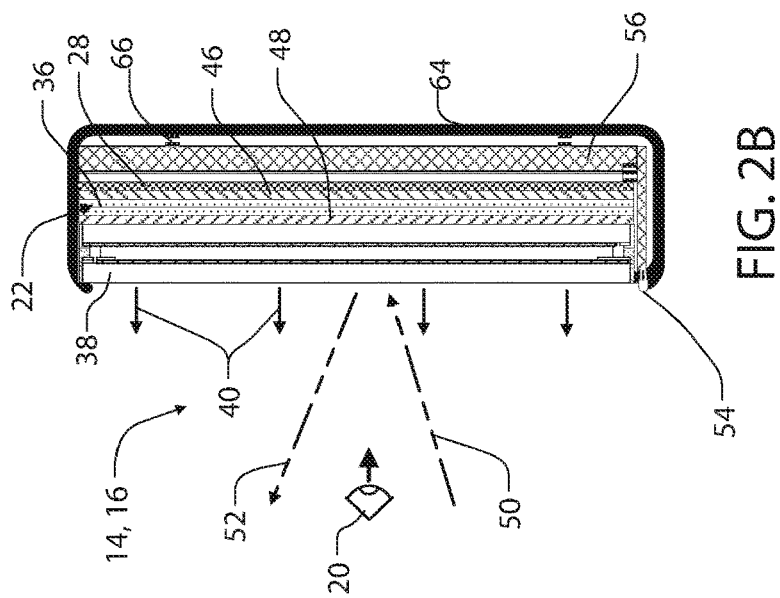
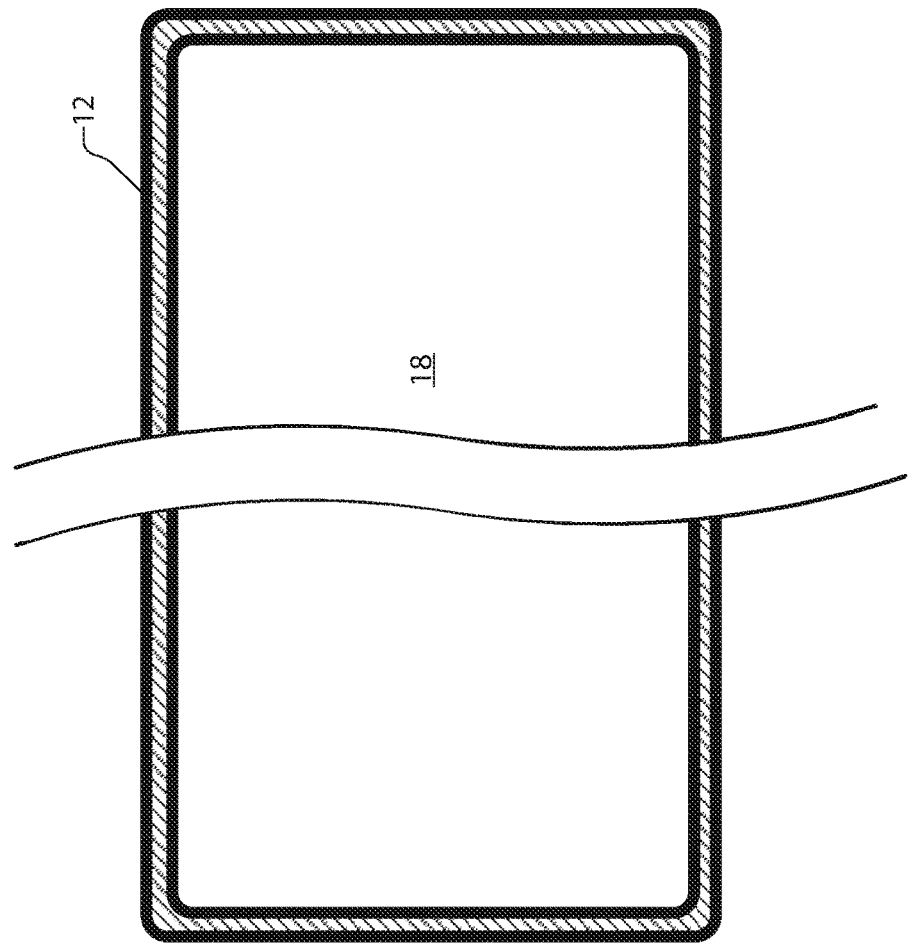
FIG. 2B
FIG. 2A

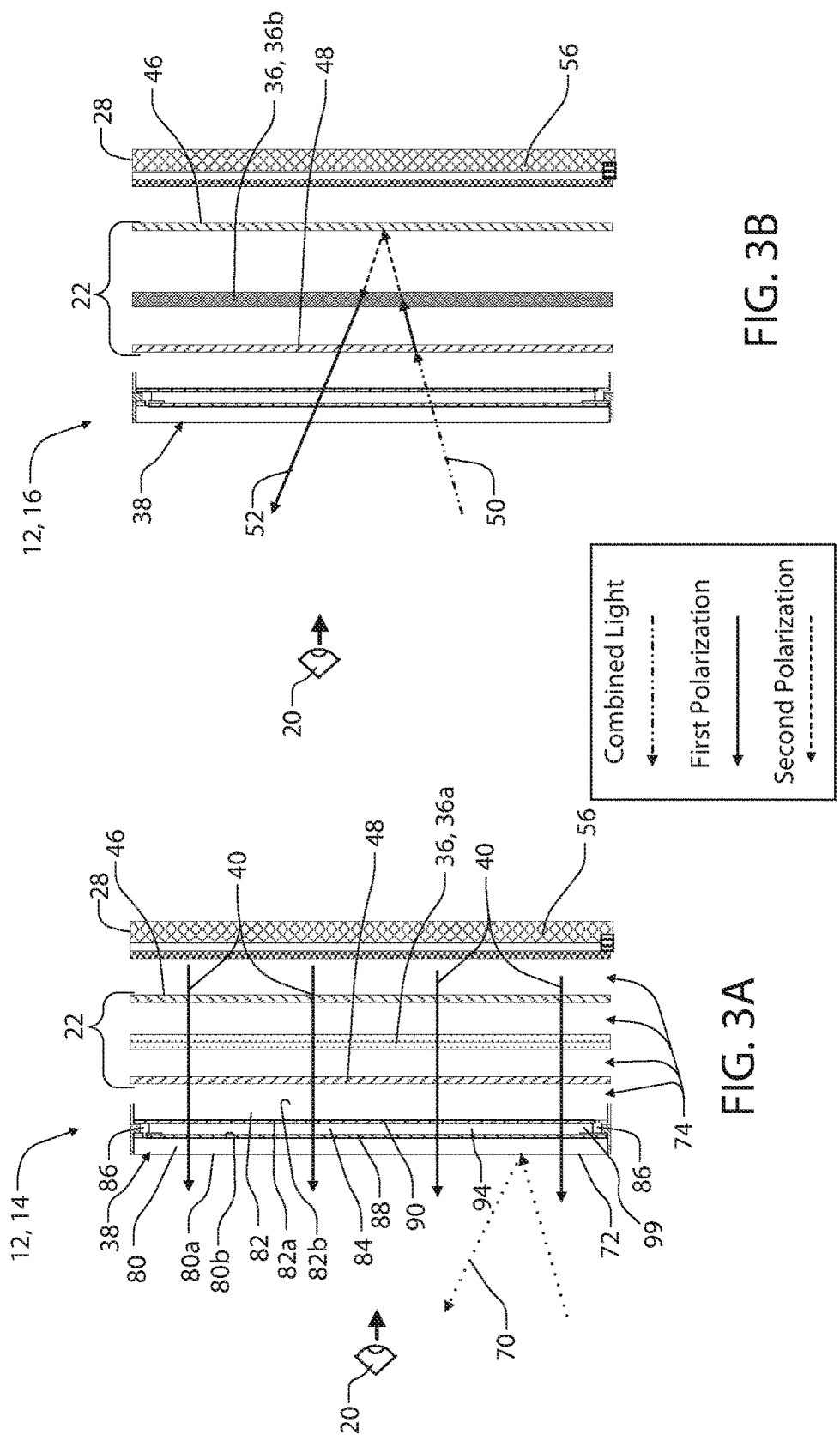

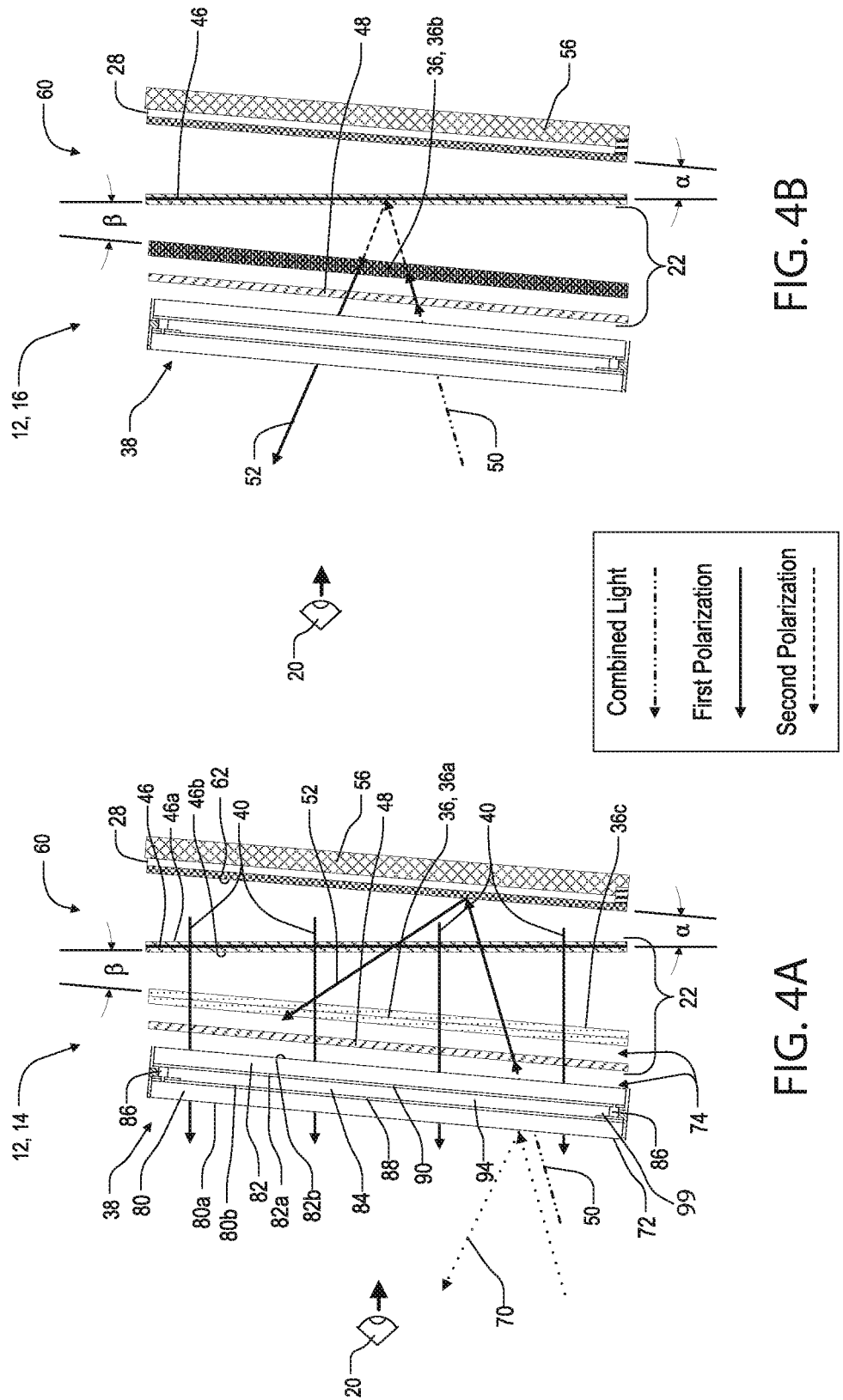

DISPLAY SYSTEM WITH PHASE ORIENTED REFLECTIVE CONTROL

CROSS-REFERENCE TO RELATED APPLICATION

This application claims priority to and the benefit under 35 U.S.C. § 119(e) of U.S. Provisional Patent Application No. 62/345,234, filed on Jun. 3, 2016, entitled "DISPLAY SYSTEM WITH PHASE ORIENTED REFLECTIVE CONTROL," and U.S. Provisional Patent Application No. 62/345,240, filed on Jun. 3, 2016, entitled "DISPLAY SYSTEM WITH PHASE ORIENTED REFLECTIVE CONTROL, the entire disclosures of which are hereby incorporated herein by reference.

TECHNOLOGICAL FIELD

The present disclosure generally relates to an emissive display system, and more particularly, an emissive display system having an electro-optic device.

BACKGROUND OF THE DISCLOSURE

Electro-optic assemblies are being used in various vehicular and building applications, e.g., within rearview display devices and variably transmissive windows. Use of these assemblies in various applications can be limited by cost, aesthetic and functional considerations. Accordingly, new electro-optic assembly designs, configurations and assemblies, along with methods of making them, are needed particularly in view of reducing material and processing costs, improving aesthetics, and/or enhancing functionality.

BRIEF SUMMARY

According to one aspect of the present disclosure, a vehicle display mirror system is disclosed. The system comprises a display device and a reflecting polarizer. The display device is operable to display image data on a display surface as display light. The reflecting polarizer comprises a light receiving surface proximate the display surface and configured to output the display light in a first polarization from an emitting surface. The system further comprises a liquid crystal element, a polarizing element, and a controller. The controller is in communication with the liquid crystal element. The controller is configured to activate and selectively align a liquid crystal material to pass the display light through the liquid crystal element and deactivate the liquid crystal element to adjust a received light from the first polarization to a second polarization to reflect the second polarization from the emitting surface.

According to another aspect of the present disclosure, a vehicle display mirror system is disclosed. The system comprises a display device operable to display image data on a display surface as display light. The system further comprises a reflecting polarizer comprising a light receiving surface disposed proximate the display surface. The reflecting polarizer is configured to output the display light in a first polarization from an emitting surface and is angled from the display surface at a first angle. The system further comprises a liquid crystal element comprising a liquid crystal material and forming a first surface and a second surface. The first surface is disposed proximate the emitting surface, and the liquid crystal element is angled from the reflecting polarizer at a second angle. The system further comprises a polarizing layer forming a third surface and a fourth surface. The third surface is disposed proximate the second surface of the liquid crystal element.

The system further comprises a controller in communication with the liquid crystal element. The controller is configured to selectively control the liquid crystal material to a display state and a mirror state. In the display state, the controller is configured to align the liquid crystal material to pass the display light through the liquid crystal element in the first polarization and outward from the fourth surface. In the mirror state, the controller is configured to deactivate the liquid crystal element to adjust a received light from the first polarization to a second polarization and reflect the second polarization from the emitting surface.

According to yet another aspect of the present disclosure, a vehicle display mirror system is disclosed. The system comprises a display device operable to display image data on a display surface as display light. The system further comprises a reflecting polarizer comprising a light receiving surface disposed proximate the display surface. The reflecting polarizer is configured to output the display light in a first polarization from an emitting surface and is angled from the display surface at a first angle. The system further comprises a liquid crystal element comprising a liquid crystal material and forming a first surface and a second surface. The first surface is disposed proximate the emitting surface and the liquid crystal element is angled from the reflecting polarizer at a second angle. The first angle and the second angle form an interior angle, and the system further comprises a polarizing layer forming a third surface and a fourth surface. The third surface is disposed proximate the second surface of the liquid crystal element.

The system further comprises a controller in communication with the liquid crystal element. The controller is configured to selectively control the liquid crystal material to a display state and a mirror state. In the display state, the controller is configured to align the liquid crystal material to pass the display light through the liquid crystal element in the first polarization and outward from the fourth surface. In the mirror state, the controller is configured to deactivate the liquid crystal element to adjust a received light from the first polarization to a second polarization and reflect the second polarization from the emitting surface.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features of the other embodiments.

BRIEF DESCRIPTION OF THE DRAWINGS

In the drawings:

FIG. 2A is a front view of a display apparatus according to one aspect of the disclosure;

FIG. 2B is a side cross-sectional view of the display apparatus of FIG. 2A, in accordance with an aspect of the disclosure;

FIG. 3A is a partially exploded, side cross-sectional view of a display apparatus in a display state, in accordance with another aspect of the disclosure;

FIG. 3B is a partially exploded, side cross-sectional view of a display apparatus in a mirror state;

FIG. 4A is a partially exploded, side cross-sectional view of a display apparatus having an angled configuration demonstrating a display state, in accordance with another aspect of the disclosure;

FIG. 4B is a partially exploded, side cross-sectional view of a display apparatus having an angled configuration demonstrating a mirror state.

DETAILED DESCRIPTION OF EMBODIMENTS

Figure 1:
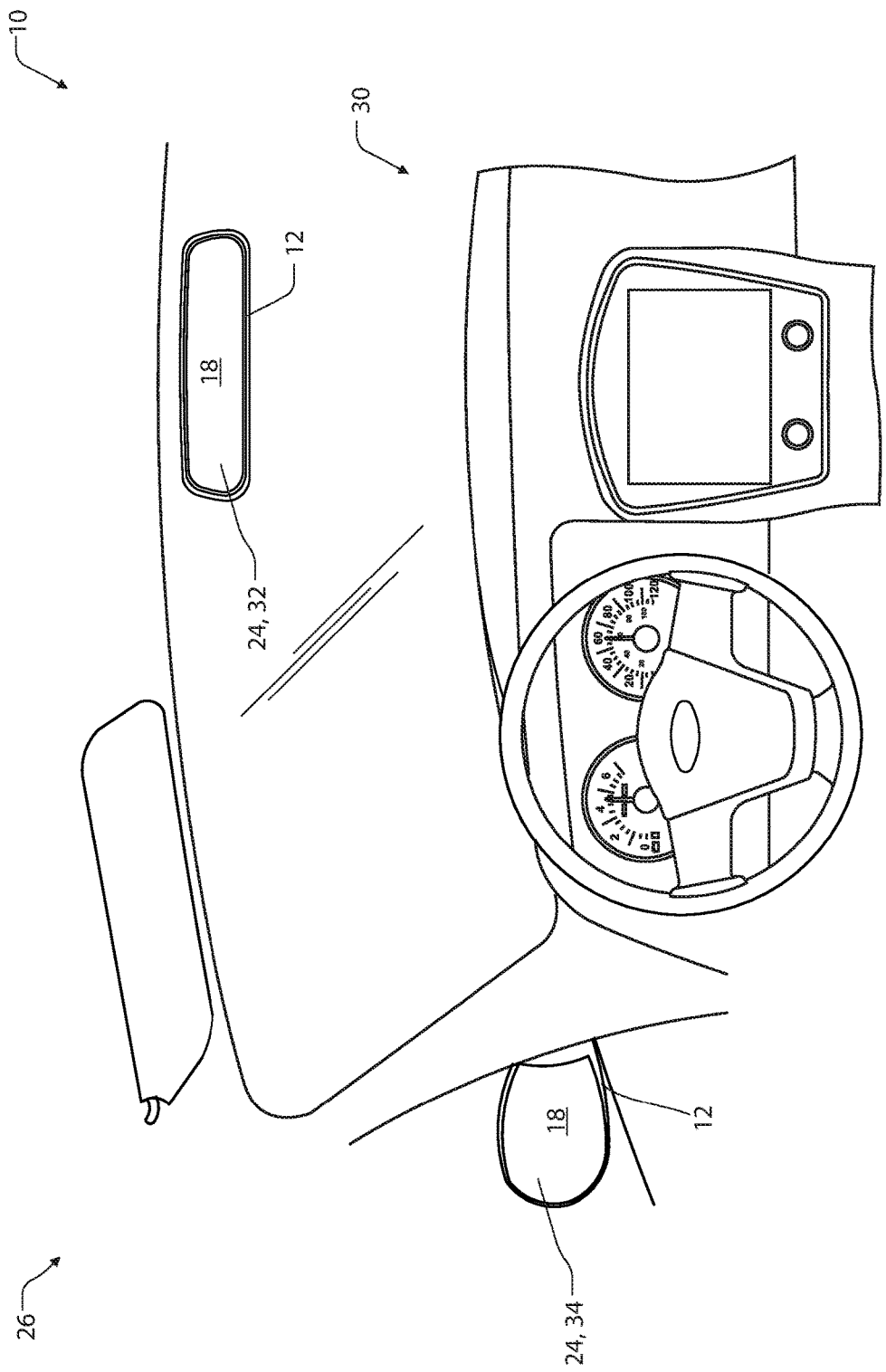
FIG. 1 is a projected view of a passenger compartment of a vehicle comprising a display system.

The present illustrated embodiments reside primarily in combinations of method steps and apparatus components related to an electro-optic device. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-4, a display system 10 is depicted including a display apparatus 12. The display system 10 may be operable to change operating states from a display state 14 as demonstrated in FIGS. 3A and 4A to a mirror state 16 demonstrated in FIGS. 3B and 4B. In the display state 14, a viewing surface 18 of the display system 10 may be configured to project image data outward toward a viewer 20. In the mirror state 16, the display apparatus 12 may be deactivated and a switchable reflector 22 may be configured in a reflective configuration. Deactivating the display 12 may be achieved by deactivating a backlit or edge-lit lighting device of the display device 28. The switchable reflector 22 may correspond to a mirror device configured to change from a substantially transparent state to a reflective state. As further discussed herein, the display apparatus 12 may provide for a device operable to switch from the display state 14 to the mirror state 16 in response to a control signal from the controller.

In an exemplary embodiment, the display system 10 may be configured to function as a rearview display 24 for the vehicle 26. In the display state 14, a display device 28 of the display apparatus 12 may display image data through the viewing surface 18. The image data may be captured by one or more imagers in communication with the display system 10. Examples of the one or more imagers are further discussed in reference to FIG. 5. In various embodiments, the one or more imagers may be configured to capture image data of various fields of view of a passenger compartment 30 and/or scenes proximate the vehicle 26. In this way, the display system 10 may selectively display the image data in the display state 14 or a reflected scene in the mirror state 16.

The display apparatus 12 of the display system 10 may be implemented as the interior rearview display 32, a side-mirror display 34, and/or various other components of the vehicle 26. Though discussed in reference to an automotive vehicle, the display system 10 may be utilized for various applications including, but not limited to, transit vehicles, nautical vessels, aircraft, etc. Accordingly, the disclosed embodiments may be combined or modified to suit various applications without departing from the spirit of the disclosure. Examples of rearview mirror assemblies that may contain a display may include, without limitation, mirrors comprising transflective elements (i.e., elements that are partially transmissive and partially reflective), reflective elements including prismatic reflective elements, and electrochromic mirrors. Various rearview mirror and display systems and related methods of fabrication have been addressed, for example, in U.S. Pat. Nos. 5,818,625; 6,166, 848; 6,356,376; 6,700,692; 7,009,751; 7,042,616; 7,221, 363; 7,502,156; 7,688,495; 8,237,909; 8,339,526; 8,411,245 and U.S. Pat. Application Publication No. 2008/0302657, now U.S. Pat. No. 10,017,847, each of which is incorporated herein by reference in its entirety.

Referring now to FIGS. 2A and 2B, a front view and a side, cross-sectional view of the display apparatus 12 are shown, respectively. As discussed herein, the disclosure may provide for various embodiments of the display system 10 operable to selectively function as a digital image display in the display state 14 and a mirror device in the mirror state 16. In some embodiments, the display apparatus 12 may be configured in a stacked configuration comprising a plurality of elements. The stacked elements may comprise various coatings (e.g., anti-reflective coatings, etc.) interspersed therebetween and may form a significantly thin assembly.

A plurality of the stacked elements of the display apparatus 12 may function in combination to enable the display apparatus 12 to switch from the display state 14 to the mirror state 16. The controller of the display system 10 may control the state of the display apparatus 12 by varying one or more electrical signals configured to control the display device 28 and a liquid crystal element 36. In this configuration, the controller may control the liquid crystal element 36 to activate the mirror state 16 to control the switchable reflector 22. Additionally, the display apparatus 12 may comprise an electro-optic device 38 configured to control a light transmittance of the switchable reflector 22.

The display device 28 may correspond to a display configured to generate polarized light. For example, the display device 28 may comprise light sources configured to emit partially or completely polarized light. Such displays may be equipped with various light sources including, but not limited to, light emitting diode (LED) sources, or laser diode sources, and/or various light sources used with a liquid crystal display (LCD). In an exemplary embodiment, the display 28 device may correspond to an LCD configured to output display light 40 having a first polarization in the display state 14 such that the image data may be output through the viewing surface 18. In this way, the image data may be visible to the viewer 20 (e.g., a passenger or operator of the vehicle 26).

The terms first polarization and second polarization described herein may define a polarization state of electromagnetic waves of light. The first polarization state and the second polarization state may correspond to perpendicular planes of linear polarization. In some embodiments, the first polarization and the second polarization could be arranged at any angle relative to each other (e.g., 45 degrees). In an exemplary embodiment, the first polarization and the second polarization may be referred to as a vertical polarization and a horizontal polarization to further describe a relationship of the electromagnetic waves. However, such terminology should not be considered limiting to the specific orientation of any elements described herein. For example, such elements may include devices, layers, films, and/or various optic devices that may be better understood by describing an exemplary relationship among the elements to describe their relationship to the electromagnetic waves of light. As such, the specific properties of the elements described herein may be adjusted to suit various applications without departing from the spirit of the disclosure.

In the display state 14, the display light 40 at the first polarization may pass through a reflective polarizer 46 and continue through the liquid crystal element 36. In the display state 14, the liquid crystal element 36 may be controlled to an active state 36a by the controller. In this configuration, the display light 40 may maintain the first polarization and pass through a polarizing layer 48 and the electro-optic device 38 without being significantly inhibited. Accordingly, the polarizing layer 48 may be oriented to pass the display light 40 at the first polarization. In this way, the display apparatus 12 may be configured to output the image data as the display light 40 in the display state 14.

The reflective polarizer 46 may be configured to transmit light having one type of polarization while substantially reflecting light of the opposite polarization. This may produce an effect of making the reflective polarizer 46, the liquid crystal element 36, the polarizing layer 48, and the electro-optic device 38 substantially transparent to the display light 40 in the display state 14. Additionally a received light 50 may be reflected back toward a viewer 20 in the mirror state 16. In some embodiments, the reflective polarizer 46 may be utilized as an outer polarizing layer of the display device 28. The reflective polarizer 46 may be implemented by various films or layers as further discussed herein.

In the mirror state 16 or reflective state, the controller may deactivate the liquid crystal element 36. In this configuration, the received light 50 corresponding to a rearward scene (e.g., a scene similar to conventional rearview mirror) may enter the viewing surface 18. The received light 50 may pass through the polarizing layer 48, which may be configured to pass the received light in the first polarization. The received light may then enter the liquid crystal element 36 wherein the received light 50 may be re-oriented from the first polarization to the second polarization.

The received light 50 at the second polarization may be reflected from the reflective polarizer 46 as reflected light 52 in the second polarization. The reflected light 52 may then be shifted back to the first polarization and emitted outward through the polarizing layer 48. Light may then exit outward through the electro-optic device 38 toward the viewer 20. In some embodiments, the display apparatus 12 may comprise a glare sensor 54 in communication with a control circuit 56 of the controller. In this configuration, the controller may identify a glare light received by the glare sensor 54 and adjust an intensity of the reflected light 52 to prevent glare light from distracting the viewer 20.

The reflective polarizer 46 may correspond to a plurality of thin film layers incorporated in the display apparatus 12. In some embodiments, anisotropic polymer based films (APBF) may be utilized to provide the polarizing functionality of these elements. The reflective polarizer 46 may correspond to a multilayered polymer film comprising a body of alternating layers of a crystalline-based polymer and another selected polymer, or by micro-structured film-based polarizers, such as brightness enhancement films. For example, the reflective polarizer 46 may be implemented by dual brightness enhancement films (DBEF) including, but not limited to, DBEF-E, DBEF-Q, APF 25, APF 35, APF 50, etc., all of which are manufactured by 3M, Inc. (see, e.g., WO 95/17303, U.S. Pat. No. 5,422,756), or by multilayered films containing alternating polymeric layers stretched in chosen directions.

The polarizing layer 48 may also correspond to a polymer film and may correspond to various films providing for polarization of light entering the viewing surface 18. For example, the polarizing layer 48 may correspond to an optical polymer thin film with anisotropic properties. In this configuration, the polarizing layer 48 may be configured to limit the received light 50 entering the switchable reflector 22 to the first polarization. The display apparatus 12 may then control the received light to be reflected or absorbed by the reflective polarizer 46 depending on a control state of the liquid crystal element 36. The disclosure provides for various embodiments of the display apparatus 12 operable to selectively activate the mirror state 16.

FIGS. 3A, 3B, 4A, and 4B demonstrate partially exploded, side cross-sectional views of the display apparatus 12. FIGS. 3A and 4A demonstrate examples of the display state 14, and FIGS. 3B and 4B demonstrate examples of the mirror state 16. Referring to FIGS. 3A and 4A, as discussed previously, in the display state 14, the display light 40 at the first polarization may pass through the reflective polarizer 46. The display light 40 may then continue through the liquid crystal element 36. The first polarization is shown as a solid line and the second polarization is shown as a broken or dashed line in FIGS. 3A, 3B, 4A, and 4B. Further details regarding the controller are discussed in reference to FIG. 5.

In the display state 14, the liquid crystal element 36 may be controlled to an active state 36a by the controller. The active state 36a of the liquid crystal element 36 may correspond to an application by the controller of an applied voltage. The applied voltage may cause the liquid crystal molecules of a liquid crystal material of the liquid crystal element 36 to align with the field induced by the applied voltage. In this configuration, the display light 40 may maintain the first polarization through the liquid crystal element 36.

The display light 40 in the first polarization may exit the liquid crystal element 36 and reach the polarizing layer 48. The polarizing layer 48 may be oriented to pass the display light 40 at the first polarization. The display light 40 may then continue to enter the electro-optic device 38. The controller may control the electro-optic device 38 to be substantially transparent such that the display light 40 is not inhibited. In this way, the display apparatus 12 may be configured to output the image data as the display light 40 in the display state 14.

Referring to FIGS. 3B and 4B, in the mirror state 16 or reflective state, the controller may deactivate the liquid crystal element 36. In an inactive state 36b, a thickness of the liquid crystal may be configured to rotate the polarization of light passing through from the first polarization to the second polarization. For example, the liquid crystal element 36 in the inactive state 36b may rotate the received light 50 in the first polarization by 90 degrees. The inactive state 36b may be controlled by the controller by removing the applied voltage from the liquid crystal element 36. In this way, the controller may selectively activate the mirror state 16 of the switchable reflector 22.

In the mirror state 16, the received light 50, which may correspond to combined light, may pass through the electro-optic device 38 via the viewing surface 18. The received light 50 corresponding to the first polarization may then pass through the polarizing layer 48. The received light 50 may enter the liquid crystal element 36 in the first polarization and may be shifted to the second polarization. The received light 50 at the second polarization may then be reflected from the reflective polarizer 46 as the reflected light 52. The reflected light 52 may then enter the liquid crystal element 36, where the reflected light 52 is shifted back to the first polarization.

The reflected light 52 at the first polarization may enter and pass through the polarizing layer 48. The reflected light 52 may then exit outward through the electro-optic device 38 toward the viewer 20. In some embodiments, the display apparatus 12 may comprise a glare sensor 54 in communication with a control circuit 56 of the controller. In this configuration, the controller may identify a glare light received by the glare sensor 54 and adjust an intensity of the reflected light 52 to prevent glare light from distracting the viewer 20.

Referring now to FIGS. 4A and 4B, the display apparatus 12 is shown in an angled configuration 60. The angled configuration 60 may comprise similar elements and components to the display apparatus 12 discussed in reference to FIGS. 3A and 3B. As such, the angled configuration 60 is described with like reference numerals corresponding to like elements for clarity. For some applications, the angled configuration 60 may limit reflections particularly in the display configuration such that the display light 40 is not distorted by the reflected light 52.

The angled configuration 60 may comprise a display surface 62 of the display device 28 angled at a first angle $\alpha$ from a first surface 46a of the reflective polarizer 46. Additionally, a second surface 46b of the reflective polarizer 46 may be angled at a second angle $\beta$ from a third surface 36c of the liquid crystal element 36. The polarizing layer 48 and the electro-optic element may be arranged substantially parallel to the liquid crystal element 36. The first angle $\alpha$ and the second angle $\beta$ of the respective layers or elements of the display apparatus 12 may be maintained by a housing 64 that may include one or more spacers 66 as shown in FIG. 2B.

The angled configuration 60 may provide for the received light 50 in the display state 14 to be reflected away from the viewer 20. For example, as shown in FIG. 3A, the received light 50 at the first polarization may pass through the reflective polarizer 46 in the active state 36a and be at least partially reflected from the display surface 62. Accordingly, a small percentage of the reflection may be apparent to the viewer 20 over the image data. However, the first angle $\alpha$ may reflect the light outward from the display surface 62 at an increased angle than that of the reflected light 52 as illustrated in FIG. 3B. Accordingly, the first angle $\alpha$ and the second angle $\beta$ may serve to reflect the reflected light 52 outward from the viewing surface 18 out of the viewing plane. In this configuration, the reflected light 52 may not be visible to the viewer 20 and may not distract the viewer 20 from the image data of graphical information projected in the display light 40.

The first angle $\alpha$ and the second angle $\beta$ may be substantially similar such that the display surface 62 is significantly parallel to the third surface 36c of the liquid crystal element 36. In some embodiments, the first angle $\alpha$ and the second angle $\beta$ may form interior angles bisected by the reflective polarizer 46. In this configuration, the reflective polarizer 46 may form a transversal to the interior angles formed by the first angle $\alpha$ and the second angle $\beta$. Accordingly, the structure of the display apparatus 12 may be maintained in a thin profile by maintaining the parallel relationship between the display surface 62 and the liquid crystal element 36.

The first angle $\alpha$ and the second angle $\beta$ may range in various embodiments from approximately 1 degree to 8 degrees. In an exemplary embodiment, the first angle $\alpha$ and the second angle $\beta$ may be approximately between 2 degrees and 6 degrees. In some embodiments, the first angle $\alpha$ and the second angle $\beta$ may be approximately between 3 degrees and 5 degrees and may be approximately 4 degrees. Accordingly, the first angle $\alpha$ and the second angle $\beta$ may vary to suit a particular application of the display apparatus 12 without departing from the spirit of the disclosure.

Referring now to FIGS. 3A and 4A, an undesirable reflection 70 is shown reflected from the viewing surface 18. Such a reflection may distract the viewer 20 from viewing the image data projected as the display light 40 through the viewing surface 18. In order to limit the undesirable reflection 70, an anti-reflective coating 72 may be applied to the viewing surface 18. The anti-reflective coating 72 may similarly be applied to one or more interface surfaces 74 disposed between each of the stacked elements forming the display apparatus 12. The anti-reflective coating 72 may correspond to various coatings, including, but not limited to, silicon nitride, titanium oxide, a p-type (e.g., boron doped) amorphous silicon film, an intrinsic (i-type or undoped) amorphous silicon film, an n-type (e.g., phosphorous doped) amorphous silicon film, etc.

In general, each of the interface surfaces 74 may potentially reflect at least a portion of the received light 50 and reflect the light toward the viewer 20. The anti-reflective coating(s) 72 as described may serve to limit the undesirable reflections (e.g., the undesirable reflection 70) from the interface surfaces 74. In this configuration, the reflected light 52 from the reflective polarizer 46 may be preserved for display in the mirror state 16 while limiting the undesirable reflections in the display state 14. Accordingly, the disclosure may provide for various arrangements of the elements of the display apparatus 12 configured to improve display performance in various operating environments.

In some embodiments, the interface surfaces 74 may be laminated via specialized processes to further improve display performance of both the display light 40 and the reflected light 52. Accordingly, each of the interface surfaces 74 may be optically coupled via one or more lamination processes. The lamination processes may utilize beads suspended in an optical adhesive to ensure that each mating pair of the interface surfaces 74 is parallel. For example, an optical adhesive having beads of transparent glass or polymer may be utilized to accurately space the switchable reflector 22 from the electro-optic device 38. By providing consistent spacing between the interface surfaces 74, the lamination process may limit undesirable reflections that may result from misalignment of the respective interface surfaces 74.

The beads in the optical adhesive may have a similar refractive index to the substrates and to the optical adhesive. Additionally, beads that are smaller than about 50 microns in diameter may be utilized so they may not be easily visible. In some embodiments, the beads may be smaller than about 30 microns. In some embodiments, beads or fibers may be used to consistently space the interface surfaces 74. However, beads may be utilized for the spacer for sizes between 20 microns and about 50 microns since beads have a smaller cross section. Below 20 microns the spacers are small enough that the cross section of the beads or fibers may be of less concern.

For the display apparatus 12 with multiple substrates (e.g., the surfaces of the liquid crystal element 36, the display device 28, and the electro-optic device 38), it may be beneficial to use thin substrates to reduce the overall weight and thickness of the display apparatus 12. In some cases, for example, when using DBEF film as the reflective polarizer 46, additional substrates may be needed in front or behind the film. The display device 28 may also have multiple substrates. The display apparatus 12 may include more than 6 substrates in all, and, in some configurations, may include 7 or more substrates. To keep the weight and thickness of the display apparatus 12 low, the substrates may be approximately 1.1 mm thick or less. In some embodiments, the substrates may have a thickness less than or equal to 0.7 mm. In an exemplary embodiment, the display apparatus 12 may include the electro-optic device 38 comprising two substrates of approximately 1.1 mm and the switchable reflector 22 comprising the liquid crystal element 36 with two substrates of approximately 0.4 mm each.

In some embodiments, the optical adhesives may have an index of refraction close to that of the substrates it is bonding together. For example, the optical adhesive between the switchable reflector 22 and the electro-optic device 38 may have an index of refraction close to that of the corresponding interface surfaces 74. The equation for the reflectivity R of the combined surfaces is demonstrated as equation 1, wherein the index of refraction for the first surface is $n_1$ (e.g., the surface of switchable reflector 22) and the index of refraction of the second surface is $n_2$ (e.g., the optical adhesive).

$$R = \left(\frac{n_1 - n_2}{n_1 + n_2}\right)^2 \qquad \text{(Eq. 1)}$$

Accordingly, the optical adhesive may have a refractive index within approximately 0.5 of a substrate to which it adheres to limit the reflectivity R. In some embodiments, the refractive index of the optical adhesive may be within 0.2 of each substrate forming the interface surfaces 74 to which it adheres. In an exemplary embodiment, the refractive index of the optical adhesive may be within 0.1 of each substrate forming the interface surface 74. In this configuration, the reflectivity R of the mating interface surfaces 74 of the display apparatus 12 may be limited to prevent a distraction from the image data.

Optical bonding material for the optical adhesive may include any suitable materials which may combine to limit the reflectivity as described above. For example, the optical, film-based adhesives may include but, are not limited to, acrylic pressure sensitive adhesives, polyvinyl butyral (PVB) films, aliphatic thermoplastic polyurethane (TPU) films, ionoplast films, ethylene vinyl acetate (EVA) films, etc. The optical adhesives may be laminated to the interface surfaces 74 using heat and pressure to produce a clear and substantially bubble-free bond.

Liquid, optically clear adhesives may also be utilized for the optical adhesive. Liquid, optically clear adhesives may include, but are not limited to, acrylics, epoxy, silicone, etc. Such adhesives may be bonded to the interface surfaces 74 via various processes. For example, liquid, optically clear adhesives may be cured via exposure to ultraviolet (UV) radiation, UV/moisture dual curing, UV/thermal dual curing, thermal curing, catalyzed "snap" curing, etc. The optical adhesives discussed herein may be dispensed with or without beads for spacing. Processing may further include degassing under vacuum and various curing processes to produce a clear, substantially bubble-free bond.

The electro-optic device 38 may comprise a first (e.g., front) element 80 and a second (e.g., rear) element 82. The first element 80 and the second element 82 may be a sealably bonded in spaced-apart relation to define a chamber 84. Front element 80 has a front surface 80a and a rear surface 80b. The rear element 82 has a front surface 82a and a rear surface 82b. For purposes of further reference, the front surface 80a of the front element 80 may be referred to as the first surface, and the rear surface 80b of the front element 80 may be referred to as a second surface. The front surface 82a of the rear element 82 may be referred to as a third surface, and the rear surface 82b of rear element 82 may be referred to as a fourth surface. In an exemplary embodiment, both elements 80 and 82 may correspond to substantially transparent substrates sealably bonded via a seal member 86.

The electro-optic device 38 may include a first electrode 88 carried on one of the second surface 80b and the third surface 82a. A second electrode 90 may be disposed on one of the second surface 80b and third surface 82a. The first electrode 88 may comprise one or more layers and may function as a color suppression coating. The first electrode 88 and the second electrode 90 may correspond to significantly transparent conductive layers. For example, the first electrode 88 and the second electrode 90 may correspond to thin film coatings of indium tin oxide (ITO) applied to the second surface 80b and the third surface 82a, respectively. In this configuration, light in the form of the display light 40, the received light 50, and the reflected light 52 may pass through the electro-optic device 38 or be selectively inhibited in response to a control signal from the controller configured to dim the electro-optic device 38.

The chamber 84 formed by the first element 80 and the second element 82 may be configured to retain an electro-optic medium 94 configured to vary in transmittance in response to the voltage received from the controller via the first electrode 88 and the second electrode 90. The electro-optic medium 94 may correspond to an electro-chromic medium. Examples of electro-optic mirror constructions are disclosed in U.S. Pat. No. 5,434,407, entitled "AUTOMATIC REARVIEW MIRROR INCORPORATING LIGHT PIPE," issued Jan. 18, 1995, to F. T. Bauer et al.; U.S. Pat. No. 5,448,397, entitled "OUTSIDE AUTOMATIC REARVIEW MIRROR FOR AUTOMOTIVE VEHICLES," issued Sep. 5, 1995, to W. L. Tonar; U.S. Pat. No. 5,451,822, entitled "ELECTRONIC CONTROL SYSTEM," issued Sep. 19, 1995, to J. H. Bechtel et al.; U.S. Pat. No. 5,818,625, entitled "ELECTROCHROMIC REARVIEW MIRROR INCORPORATING A THIRD SURFACE METAL REFLECTOR," issued Oct. 6, 1998, to Jeffrey A. Forgette et al.; and U.S. Pat. No. 6,157,480, entitled "IMPROVED SEAL FOR ELECTROCHROMIC DEVICES," issued Dec. 5, 2000, to Anderson. Each of these patents and the patent application are commonly assigned with the present invention and the disclosures of each, including the references contained therein, are hereby incorporated herein in their entirety by reference.

In an exemplary embodiment, the electro-optic device 38 may be color neutral. For example, the electro-optic device 38 may correspond to a color neutral electro-chromic element. The color neutral element may darken in a gray-scale, which may prevent a discoloration of the image data displayed on the viewing surface 18. An example of a color neutral electro-chromic element is described in U.S. Pat. No. 6,020,987, entitled "ELECTROCHROMIC MEDIUM CAPABLE OF PRODUCING A PRE-SELECTED COLOR," the entire disclosure of which is incorporated herein by reference.

Figure 5:
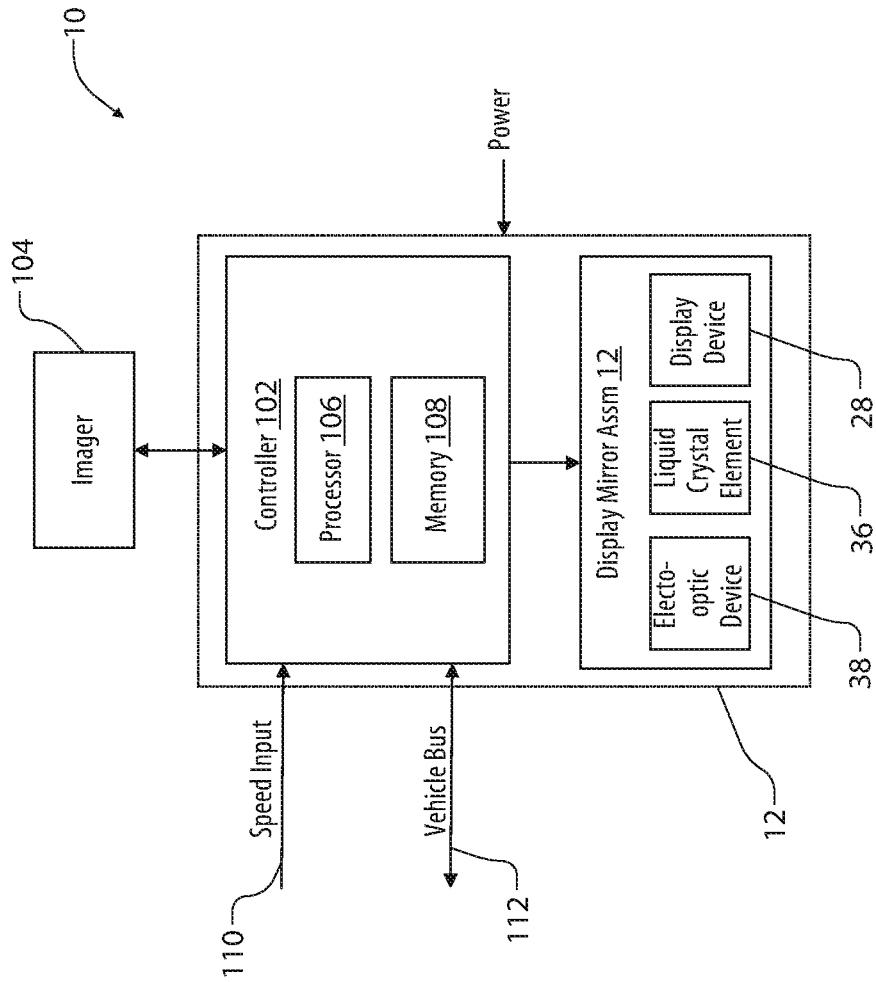
FIG. 5 is a block diagram of a display system in accordance with the disclosure.

Referring now to FIG. 5, a block diagram of the display system 10 is shown. As discussed herein, a controller 102 of the display system 10 may be in communication with at least one imager 104. In some embodiments, the imager 104 may correspond to a complementary metal-oxide-semiconductor (CMOS), for example, a CMOS active-pixel sensor (APS) or a charge coupled device (CCD). In this configuration, the controller 102 may be operable to process the image data as supplied in analog or digital form from the imager 104.

The controller 102 may further be operable to output the image data captured by the imager 104 on the display apparatus 12. The display apparatus 12 may correspond to a display configured to generate polarized light. For example, the display device 28 may comprise light sources configured to emit partially or completely polarized light. Such displays may be equipped with various light sources including, but not limited to, light emitting diode (LED) sources, or laser diode sources, and/or various light sources used with a liquid crystal display (LCD). In an exemplary embodiment, the display device 28 may correspond to an LCD configured to output display light 40 having a first polarization in the display state 14 such that the image data may be output through the viewing surface 18. In this way, the image data may be visible to a viewer 20 (e.g., a passenger or operator of the vehicle 26.

The controller 102 may be configured to control the display apparatus 12 to change from the display state 14 to the mirror state 16 by controlling the liquid crystal element 36. The controller 102 of the display system 10 may control the state of the display apparatus 12 by varying one or more electrical signals configured to control the display device 28 and a liquid crystal element 36. In this configuration, the controller 102 may control the liquid crystal element 36 to activate the mirror state 16 to control the switchable reflector 22. Accordingly, the controller 102 may control the state of the display apparatus 12 by controlling the passage of the received light 50 and the reflected light 52 via a selective alignment of the crystalline structure of the liquid crystal element 36.

The controller 102 may further be operable to control the electro-optic device 38 to control the reflectance of the received light 50 and the received light based on incoming light detected by the glare sensor 54. The electro-optic device 38 may comprise an electro-optic medium 94 configured to vary in transmittance in response to the voltage received from the controller 102 via the first electrode 88 and the second electrode 90. The electro-optic medium 94 may correspond to an electro-chromic medium. The controller 102 may comprise a processor 106 operable to process the image data as supplied in analog or digital format from the imager 104. In various embodiments, the processor 106 may be implemented as a plurality of processors, a multicore processor, or any combination of processors, circuits, and peripheral processing devices.

The controller 102 may further comprise a memory 108. The memory 108 may comprise various forms of memory, for example, random access memory (RAM), dynamic RAM (DRAM), synchronous DRAM (SDRAM), and other forms of memory configured to store digital information. The memory 108 may be configured to store the image data from the imager 104 for processing. Processing the image data may comprise scaling and cropping, as well as rendering graphical data for display on the display apparatus 12. In some embodiments, the memory 108 may further be configured to store additional programming information including method and processes for operation of the display system 10.

The controller 102 may further be in communication with a plurality of inputs, for example, a speed input 110, and a vehicle bus 112. The speed input 110 may provide a signal communicating a speed of the vehicle 26 via a speedometer or any device operable to measure and communicate data corresponding to the speed of a vehicle 26. The vehicle bus 112 may be implemented using any suitable standard communication bus, such as a Controller Area Network (CAN) bus, a Local Interconnect Network (LIN) bus, etc. The vehicle bus 112 may be configured to provide a variety of additional information to the controller 102. Such information may correspond to one or more vehicle states, for example, a gear selection, passenger occupancy, a headlight activation, etc., which may be utilized by the controller 102 to control the display of the image data and/or the transmission state (e.g., the display state 14 and mirror state 16) of the display apparatus 12.

The electro-optic device 38 may include a spectral filter 99 to obscure from view the seal member 86. The spectral filter 99 may be a reflector material. To be included as part of the mirror's field of view, the U.S. Transportation Department's, National Highway Safety Administration's, Federal Motor Vehicle Safety Standard 111 (FMVS111) requires a mirror surface to be greater than 35%. In one example, the spectral filter material 99 may comprise chrome and ruthenium.

When the display apparatus 12 is in the display state 14, the reflectance of the spectral filter material 99 does not change. This results in a reflected image that is competing with the display image. The size, brightness and location of a headlamp, for example, may appear in the display image as well as in the reflected image from the spectral filter 99 causing a distraction to the observer. It may be beneficial to reduce the reflectance of the spectral filter 99 to below the 35% requirement of FMVSS111. If the reflectance is below the 35% level, it may no longer be part of the legal requirement for a mirror's field of view. Reducing the reflectance of the spectral filter 99 reduces the intensity of the competing image and reduces the distraction to the observer. It is preferred for the reflectance from the spectral filter 99 to be 20% or less or 10% or less. In one example, the spectral filter 99 comprises a chrome-oxynitride coating with reflectance of approximately 10%.

It will be appreciated that embodiments of the disclosure described herein may be comprised of one or more conventional processors and unique stored program instructions that control one or more processors to implement, in conjunction with certain non-processor circuits, some, most, or all of the functions of an image sensor system and method thereof, as described herein. The non-processor circuits may include, but are not limited to, signal drivers, clock circuits, power source circuits, and/or user input devices. Alternatively, some or all functions could be implemented by a state machine that has no stored program instructions, or in one or more application specific integrated circuits (ASICs), in which each function or some combinations of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It should be appreciated by those skilled in the art that the above described components may be combined in additional or alternative ways not explicitly described herein. Modifications of the various implementations of the disclosure will occur to those skilled in the art and to those who apply the teachings of the disclosure. Therefore, it is understood that the embodiments shown in the drawings and described above are merely for illustrative purposes and not intended to limit the scope of the disclosure, which is defined by the following claims as interpreted according to the principles of patent law, including the Doctrine of Equivalents.

What is claimed is:

1. A vehicle display mirror system, comprising:
  a display device operable to display image data on a display surface as display light;
  a reflecting polarizer comprising a light receiving surface disposed proximate the display surface, the reflecting polarizer configured to output the display light in a first polarization from an emitting surface, wherein the reflecting polarizer is angled in a non-parallel configuration from the display surface at a first angle, wherein the first angle is between 2 degrees and 8 degrees;
  a liquid crystal element comprising a liquid crystal material and forming a first surface and a second surface, the first surface disposed proximate the emitting surface, wherein the liquid crystal element is angled in a non-parallel configuration from the reflecting polarizer at a second angle;
  a polarizing layer forming a third surface and a fourth surface, the third surface disposed proximate the second surface of the liquid crystal element; and
  a controller in communication with the liquid crystal element, wherein the controller is configured to selectively control the liquid crystal material to:
    in a display state, align the liquid crystal material to pass the display light through the liquid crystal element in the first polarization and outward from the fourth surface; and
    in a mirror state, deactivate the liquid crystal element to adjust a received light from the first polarization to a second polarization and reflect the second polarization from the emitting surface.

2. The display mirror system according to claim 1, further comprising an electro-optic device disposed proximate the fourth surface.

3. The display mirror system according to claim 2, wherein the electro-optic device is configured to receive the received light and output the received light into the polarizing layer.

4. The display mirror system according to claim 3, wherein the electro-optic device comprises a first substrate and a second substrate configured to form a cavity, the cavity configured to retain an electro-chromic medium.

5. The display mirror system according to claim 2, further comprising a glare light sensor configured to communicate a glare signal to the controller, wherein the controller is configured to adjust a reflectance of the received light.

6. The display mirror system according to claim 1, wherein the polarizing layer is arranged substantially parallel to the liquid crystal element.

7. The display mirror system according to claim 1, wherein the first angle and the second angle are similar angles.

8. The display mirror system according to claim 1, wherein the first angle and the second angle are complementary angles orienting the display surface of the display device parallel to the liquid crystal element.

9. The display mirror system according to claim 7, wherein the first angle is between 2 degrees and 6 degrees.

10. A vehicle display apparatus, comprising:
  a display device operable to display image data on a display surface as display light;
  a reflecting polarizer comprising a light receiving surface disposed proximate the display surface, the reflecting polarizer configured to output the display light in a first polarization from an emitting surface, wherein the reflecting polarizer is angled from the display surface at a first angle;
  a liquid crystal element comprising a liquid crystal material and forming a first surface and a second surface, the first surface disposed proximate the emitting surface, wherein the liquid crystal element is angled from the reflecting polarizer at a second angle, wherein the first angle and the second angle form interior angles greater than one degree, wherein the polarizing layer is arranged as a transversal to the interior angles;
  a polarizing layer forming a third surface and a fourth surface, the third surface disposed proximate the second surface of the liquid crystal element; and
  a controller in communication with the liquid crystal element, wherein the controller is configured to selectively control the liquid crystal material to:
    in a display state, align the liquid crystal material to pass the display light through the liquid crystal element in the first polarization and outward from the fourth surface; and
    in a mirror state, deactivate the liquid crystal element to adjust a received light from the first polarization to a second polarization and reflect the second polarization from the emitting surface.

11. The vehicle display apparatus according to claim 10, wherein the first angle and the second angle are substantially similar such that the display surface is parallel to the liquid crystal element.

12. The display apparatus according to claim 10, further comprising an electro-optic device disposed proximate the fourth surface.

13. The vehicle display apparatus according to claim 12, further comprising an anti-reflective coating applied to a viewing surface of the electro-optic device.

14. The vehicle display apparatus according to claim 12, wherein the electro-optic device comprises an electrochromic structure configured to change in transmittance in response to a voltage potential communicated from the controller.

15. A vehicle display mirror system, comprising:
  a display device operable to display image data on a display surface as display light;
  a reflecting polarizer comprising a light receiving surface disposed proximate the display surface, the reflecting polarizer configured to output the display light in a first polarization from an emitting surface, wherein the reflecting polarizer is arranged at a first angle in a non-parallel configuration relative to the display surface;
  a liquid crystal element comprising a liquid crystal material and forming a first surface and a second surface, the first surface disposed proximate the emitting surface, wherein the liquid crystal element is arranged at a second angle in a non-parallel configuration relative to the reflecting polarizer, wherein the first angle and the second angle are formed by a transversal formed by the reflecting polarizer;

a polarizing layer forming a third surface and a fourth surface, the third surface disposed proximate the second surface of the liquid crystal element; and a controller in communication with the liquid crystal element, wherein the controller is configured to selectively control the liquid crystal material to:
- in a display state, align the liquid crystal material to pass the display light through the liquid crystal element in the first polarization and outward from the fourth surface; and
- in a mirror state, deactivate the liquid crystal element to adjust a received light from the first polarization to a second polarization and reflect the second polarization from the emitting surface.

16. The display mirror system according to claim 15, further comprising an electro-optic device disposed proximate the fourth surface.

17. The display mirror system according to claim 16, wherein the electro-optic device is configured to receive the received light and output the received light into the polarizing layer.

18. The display mirror system according to claim 17, wherein the electro-optic device comprises a first substrate and a second substrate configured to form a cavity, the cavity configured to retain an electro-chromic medium.

19. The display mirror system according to claim 16, further comprising a glare light sensor configured to communicate a glare signal to the controller, wherein the controller is configured to adjust a reflectance of the received light.

* * * * *